United States Patent [19]

Noda et al.

[11] Patent Number: 4,640,340
[45] Date of Patent: Feb. 3, 1987

[54] HEATED OR COOLED STEERING WHEEL

[75] Inventors: Kazushi Noda, Inazawa; Moriyuki Komatsu, Nagoya; Hiroshi Mitsunaga, Hirakata, all of Japan

[73] Assignees: Toyoda Gosei Co., Ltd., Nishikasugai; Matsushita Electric Industrial Co., Ltd., Kadoma, both of Japan

[21] Appl. No.: 663,978

[22] Filed: Oct. 18, 1984

[30] Foreign Application Priority Data

Oct. 21, 1983 [JP] Japan ................. 58-197894

[51] Int. Cl.$^4$ ............................................. F25B 21/02
[52] U.S. Cl. ........................................ 165/41; 165/42; 62/3; 74/552; 237/12.3 R
[58] Field of Search .............. 165/41, 42; 62/3; 237/12.3 R; 74/552

[56] References Cited

U.S. PATENT DOCUMENTS

| 1,125,889 | 1/1915 | Smith | 237/12.3 R |
|---|---|---|---|
| 1,276,930 | 8/1918 | Kemper et al. | 237/12.3 R |
| 1,317,491 | 9/1919 | Haiss | 237/12.3 R |
| 1,366,554 | 1/1921 | Blackburn | 237/12.3 R |
| 1,388,488 | 8/1921 | Senn | 237/12.3 R |
| 1,811,829 | 6/1931 | Folberth et al. | 237/12.3 R |
| 3,876,844 | 4/1975 | Scherenberg | 74/552 X |
| 3,948,118 | 4/1976 | Garbin | 74/552 |

FOREIGN PATENT DOCUMENTS

| 1287168 | 1/1962 | France | 62/3 |
|---|---|---|---|
| 2364801 | 5/1978 | France | 237/12.3 R |
| 436929 | 6/1948 | Italy | 165/41 |

OTHER PUBLICATIONS

"Peltier Coolers" Hughes Aircraft Company, pp. 1-21, Jul. 7, 1961.

Primary Examiner—Albert W. Davis, Jr.
Assistant Examiner—Randolph A. Smith
Attorney, Agent, or Firm—Cushman, Darby & Cushman

[57] ABSTRACT

Apparatus for heating and cooling a steering wheel includes a skin layer coupled to the outside surface of the steering wheel, a heat conductive plate coupled to an inside surface of the skin layer, a thermal storage core extending along a central portion of the steering wheel, and at least one thermoelectric transducer thermally coupled between the heat conductive plate and the thermal storage core. The thermoelectric transducer either generates heat or absorbs heat in accordance with the direction of a current flowing through the transducer. When the steering wheel is hot, current is caused to flow through the transducer in a first direction so that the transducer absorbs heat. The transducer absorbs the heat from the heat conductive plate and passes it to the thermal storage core. In turn, the heat conductive plate absorbs the heat on the skin layer of the steering wheel, thus cooling the steering wheel. When the steering wheel is too cold, the current is caused to flow in a second direction in the transducer so that the transducer generates heat. This generated heat is provided to the heat conductive plate, which in turn, heats the skin layer of the steering wheel.

7 Claims, 8 Drawing Figures

HEATED OR COOLED STEERING WHEEL

BACKGROUND OF THE INVENTION

1. Field of the Invention

The present invention relates to a vehicular steering wheel capable of being heated or cooled at least at its gripping portions.

2. Prior Art

Heretofore, various improvements have been made for improving the driver's sense of touch on a ring portion of a vehicular steering wheel, for example, the ring portion is formed of an elastic material or covered with leather. But, a steering wheel which is improved in the driver's sense of touch through adjustment of the temperature of the gripping portions of the ring portion has not been developed yet. Conventional steering wheels have drawbacks. For example, when a vehicle is parked for a long time under the scorching summer sun, the steering wheel of the vehicle becomes hot to the extent that it is impossible to grip the ring portion of the steering wheel when the vehicle is to be restarted and it is necessary to cool it for a while by some means. In winter, the steering wheel of a vehicle parked for a long time becomes fairly cold, so the ring portion is cold to touch during an initial driving stage.

SUMMARY OF THE INVENTION

The present invention has been effected in order to remedy the above-mentioned drawbacks. It is an object of the present invention to improve the driver's sense of touch by disposing heating and cooling means within a ring portion of a steering wheel, thereby adjusting the temperature of the surface of the ring portion rapidly to a predetermined level.

Another object of the present invention is to enable a driver to grip the steering wheel and start driving rapidly with a cool steering wheel, when the steering wheel was previously too hot to grip, especially after parking under the scorching sun for a long time.

Still another object of the present invention is to improve the driver's sense of touch by heating the steering wheel rapidly, when the steering wheel was previously too cool to grip.

According to the present invention, when the steering wheel is too hot to grip, for example, after parking for a long time under the scorching sun, the gripping portions can be cooled, so the vehicle can be started without loss of time. Conversely, when the gripping areas of the steering wheel are too cold in winter, the gripping areas can be heated to prevent the driver's hands from getting cold. Even during driving, by controlling the temperature of the gripping portions to a suitable temperature range, it is possible to keep appropriate the temperature transmitted to the driver's hands and thereby attain a comfortable driving condition.

DETAILED DESCRIPTION OF THE INVENTION

Figure 1:
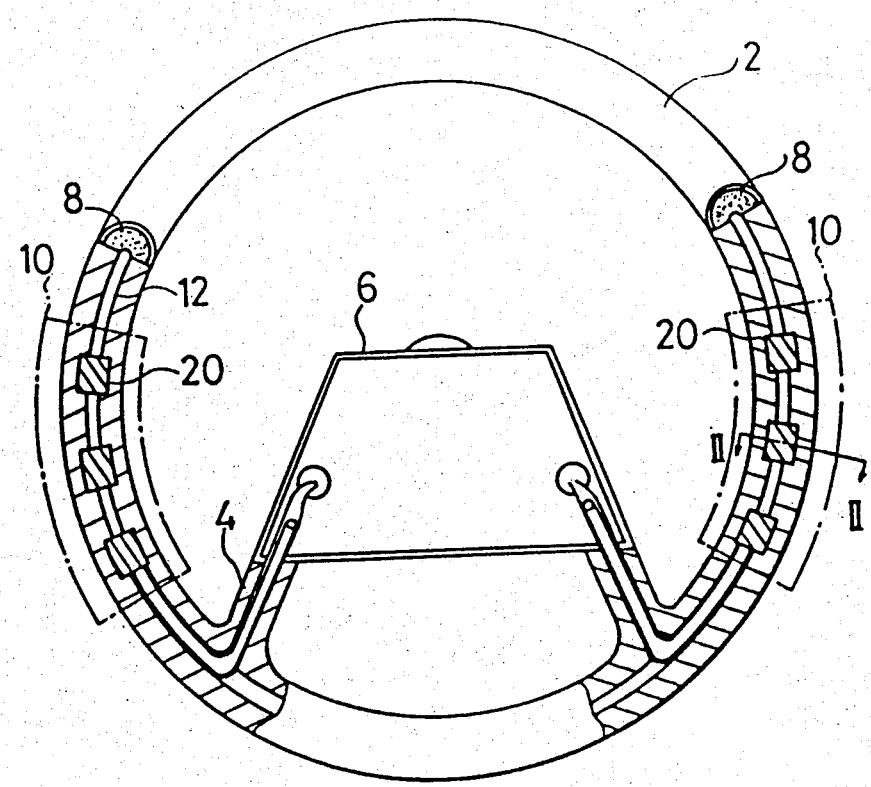
FIG. 1 is a partially sectional view of a steering wheel according to a first embodiment of the present invention.

The invention relates to a steering wheel wherein thermoelectric transducers are disposed within at least gripping portions of a steering wheel ring portion, the thermoelectric transducers each having heat generating/absorbing contact portions adapted to generate and absorb heat reversibly according to the direction of an electric current.

The ring portion is a circumferential portion of a steering wheel which the driver directly grips for transmitting a rotational force to the steering shaft. The driver grips the ring portion during driving, and in a straight running the portions that the driver grips are generally constant. More particularly, the gripping portions are in positions between hour numerals 8 and 10 and between 2 and 4 of an analog clock near a transverse axis of the steering wheel, and the portions which the hands' palms contact are outer peripheral portions of the ring portion. Therefore, the present invention is characterized in that thermoelectric transducers are disposed at least within the above gripping portions which are most likely to be gripped.

The thermoelectric transducers utilize the Peltier effect, that is, they utilize a heat generating or absorbing action in the joint portion of different kinds of materials constituting each thermoelectric transducer, which action is induced by causing an electric current to flow in the thermoelectric transducer. Each thermoelectric transducer generally has heat generating and absorbing contact portions. In this case, the joint portion of different kinds of materials exhibiting a heat generating and absorbing action of the thermoelectric transducer is defined as a heat generating/absorbing portion. For the thermoelectric transducer there may be used known thermoelectric materials comprising paired metals and semiconductors such as, for example, ZnSb, PbTe, $Bi_2Te_3$, and $Bi_2(TeSe)_3$.

The thermoelectric transducer used in the present invention includes not only each discrete device but also a thermoelectric transducer module comprising the combination of such devices.

The material of the steering wheel used in the present invention is not specially limited; for example, it may be formed of wood or a synthetic resin. The thermoelectric transducers may be disposed discretely in the gripping portions of the ring portions so that one heat generating/absorbing contact portions is exposed. An electric insulating treatment may be applied to the upper surfaces of the heat generating/absorbing contact portions so that the thus-treated upper surfaces come into direct contact with the driver's palms. As the thermoelectric transducer, a thermoelectric transducer of a large capacity and a large area may be formed along each gripping portion, or plural discrete thermoelectric transducers or modules thereof may be disposed continuously or discretely along each gripping portion.

According to a preferred embodiment, in a steering wheel formed of a synthetic resin, one heat generating-/absorbing contact portion of the thermoelectric transducers may be connected to the back of a skin layer which forms the surface of the ring portion. By connecting the heat generating/absorbing contact portions directly to the skin layer, it is made possible to transmit heat to the driver's hands' palms and absorb heat therefrom. The skin layer includes one formed by attaching a natural or synthetic leather or the like to the ring portion, one formed on the surface portion like an integral skin urethane foam, and further it generally includes the surface layer.

According to a preferred embodiment, a high heat-conductive plate capable of uniformly conducting heat at least in the driver's gripping portions is attached to the back of the skin layer. The high heat-conductive plate is formed of a good heat conductive material, such as copper, aluminum or iron. One heat generating/absorbing contact portion of each thermoelectric transducer is connected, heat-conductively, to the high heat-conductive plate, whereby the heat generating and absorbing action of the thermoelectric transducers can be transmitted efficiently to the driver's hands' palms through the high heat-conductive plate.

The heat-conductive connection referred to herein means not only a direct connection but also an indirect connection through a heat-conductive material. Connection through an electric insulating material, such as a ceramic material is also included. Even several discretely provided thermoelectric transducer modules each comprising a combination of thermoelectric transducers can exert a heat generating and absorbing effect on the whole of each gripping portion provided they are connected to the high heat-conductive plate.

In the present invention, such heat generating and absorbing means may be provided at least in the gripping portions. It goes without saying that such means may be provided throughout the entirety of the ring portion.

Generally, the steering wheel has a core member extending centrally through its interior. Preferably, therefore, the heat generating/absorbing contact portions of the thermoelectric transducers are connected to the core member, and the latter is used as a heat storing and/or heat conducting member. The core member is made of alminum, copper, iron or the like. The cross section thereof is a circle, a rectangle, or any desired shape. And the core member could have a either hollow or solid body. The connection of the heat generating-/absorbing contact portion to the core may be an indirect heat-conductive connection through a heat-conductive member. In the case where the core member is formed of a hollow tubular body, its interior may be filled with liquid (e.g. Freon or water) which evaporates at a predetermined temperature, thereby utilizing the evaporation heat to increase the heat capacity. Alternatively, a metallic powder, such as iron, aluminum or copper powder, or polyethylene glycol, oil or the like, may be sealed in the interior of the core member, or a metallic lump, such as iron, aluminum or copper lump may be connected into the interior of the core member. When the skin layer of the ring portion is cooled by flowing an electric current in the thermoelectric transducers, the heat absorbed in the skin layer is radiated to the core member. Therefore, it is desirable for the core member to have a heat capacity sufficient to suppress the rise of temperature.

More preferably, the core member is formed continuously and integrally from the ring portion to a pad portion located centrally of the steering wheel, and liquid which evaporates at a predetermined temperature is charged into the interior of the core member, and the core member is constituted as a heat pipe by processing its inside face. In this case, a well-known heat pipe structure may be adopted. By so doing, the heat generated in the thermoelectric transducer is transmitted efficiently to the boss portion through the heat pipe. If radiation fins which contact the air are formed on the boss portion and the heat pipe is connected thereto, the heat absorbed in the skin layer of the gripping portions can be conducted by the heat pipe and radiated efficiently from the radiation fins formed on the boss portion. The above can also be said of the case where heat is generated in the gripping portion, provided the flow of heat is backward. Thus, a heat circulation system can be constituted efficiently, and therefore, the heat generating and absorbing effect in the gripping portions is enhanced.

DESCRIPTION OF THE PREFERRED EMBODIMENTS

Figure 3:
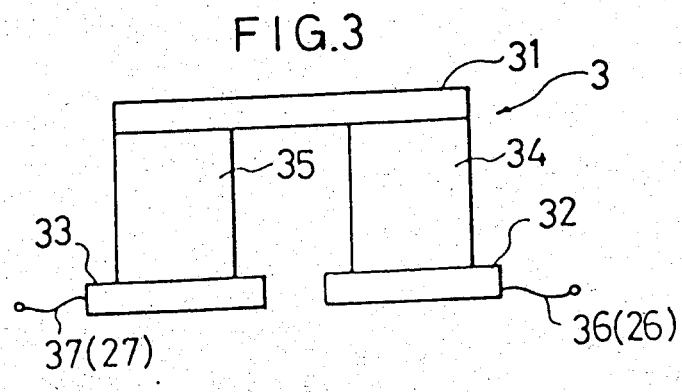
FIG. 3 is a view showing a basic construction of a thermoelectric transducer as a constituent of a thermoelectric transducer module used in the first embodiment.
Figure 2:
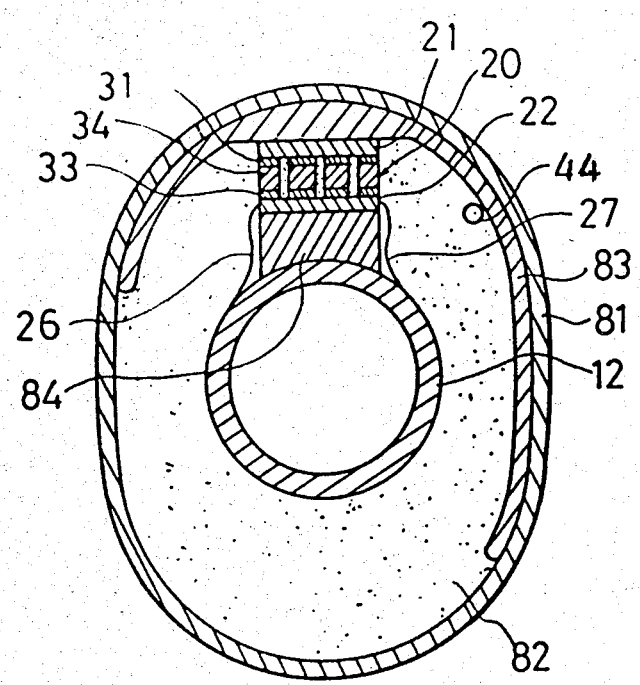
FIG. 2 is a sectional view taken on line II—II in FIG. 1.

Embodiment 1;

FIG. 1 is a partially sectional view of a steering wheel according to an embodiment of the present invention. FIG. 2 is a sectional view taken on line II—II in FIG. 1. FIG. 3 is a view showing a basic construction of a thermoelectric transducer as a component of a thermoelectric transducer module used in this embodiment. The steering wheel comprises a circular ring portion 2, spoke portions 4 integrally connected thereto and also connected to a boss portion 6. The portion 6 is connected to a steering shaft (not shown). A circular core member 12 is disposed centrally through the interior of the ring portion 2, and it extends through the spoke portions 4 to the boss portion 6. Around the core member is formed a coating layer 8. In each of both side gripping portions 10 which are most likely to be touched by the driver, there are disposed thermoelectric transducer modules 20 each comprising the combination of plural thermoelectric transducers 3. The thermoelectric transducer 3 has a p-$Bi_2Te_3$ semiconductor 34 and an n-$Bi_2Te_3$ semiconductor 35 which are connected at the ends thereof through a heat generating-/absorbing contact portion 31, and which are provided at the other end portions with heat generating/absorbing contact portions 32 and 33. If an electric current is allowed to flow between the heat generating/absorbing contact portions 32 and 33, either one contact portion performs a heat generating or absorbing action. And if the current flow is reversed, each contact portion switches from heat generating to heat absorbing action or vice versa. The thermoelectric transducer module 20 comprises, say, 22 such thermoelectric transducers 3 arranged in a matrix form which are connected in series by pattern formation of their heat generating/absorbing contact portions. The heat generating/absorbing contact portions are formed on ceramic substrates 21 and 22 which maintain an electric insulation from the exterior and integrate the thermoelectric transducers.

The coating layer 8 which forms the ring portion comprises a skin layer 81 and an integral skin urethan foam portion 82 formed in the interior. The skin layer may be formed by bonding a synthetic leather to the foam portion. To the back of the skin layer 81 is attached an aluminum plate 83 so as to partly cover the gripping portion. The plate 83 may be made of copper and functions to transmit heat uniformly to the skin layer 81. To plate 83 is connected to the ceramic substrate 21 of each thermoelectric transducer module 20. That is, the heat generating/absorbing portion 31 of each thermoelectric transducer 3 is connected, heat-conductively, to the plate 83. On the other hand, the ceramic substrate 22 of each thermoelectric transducer module 20 is connected and fixed to the core member 12 through a heat conducting member 84. That is, the heat generating/absorbing contact portions 32 and 33 of each thermoelectric transducer 3 are connected, heat-conductively, to the heat conducting member 84. Lead wires 26 and 27 of the thermoelectric transducer modules 20, connected in parallel or in series, are disposed around the core member 12 and conducted to the boss portion 6.

By causing an electric current to flow from the lead wire 26 to 27, the heat generating/absorbing contact portion 31 of each thermoelectric transducer 3 becomes a heat absorbing contact, while the heat generating/absorbing contact portions 32 and 33 become heat generating contacts. Consequently, the heat of the plate 83 is absorbed by the heat generating/absorbing contact portion 31, the heat of the skin layer 81 is absorbed by the plate 83, and the skin layer 81 absorbs the driver's hand's heat. In this way, the heat of the ring portion of the steering wheel is absorbed at its gripping portions, while the heat generated at the heat generating/absorbing contact portions 32 and 33 is stored in the core member 12 or transmitted through the core member 12 to the boss portion 6 and radiated therefrom.

Conversely, by causing an electric current to flow from the lead wire 27 to the lead wire 26, the heat generating/absorbing contact portion 31 becomes a heat generating contact, whereby heat is transmitted from the contact portions 31 to the skin layer 81 through the plate 83 and thus the gripping portions can be heated. On the other hand, the heat generating/absorbing contact portions 32 and 33 become heat absorbing contacts, whereby heat is supplied thereto from the core member 12 or from the boss portion through the core member 12.

The core member may be used as the ground wire. Moreover, the lead wires may be conducted to the boss portion through the hollow portion of the core member.

For mounting the thermoelectric transducer modules 20, there may be formed a mounting slot for the modules, and the plate 83 may be disposed thereon and covered with a synthetic leather. The thermoelectric modules 20 and the plate 83 may be integrally formed simultaneously with the molding of the ring portion.

Figure 7:
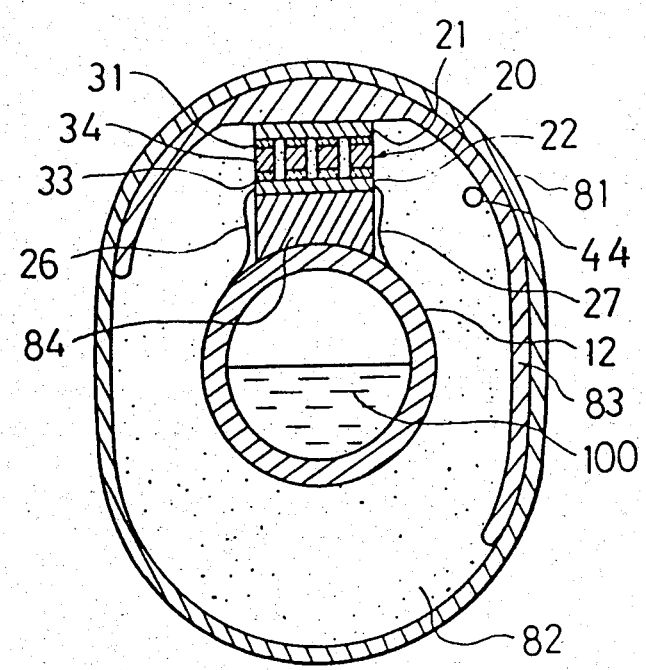
FIG. 7 is a partially sectional view of a steering wheel according to a modification of the first embodiment.

As a modified embodiment, into the hollow portion of the core member 12 of the steering wheel in the above embodiment there may be sealed Freon 100 as a heat conducting member as shown in FIG. 7 to thereby improve the heat storing effect of the core member 12.

Figure 8:
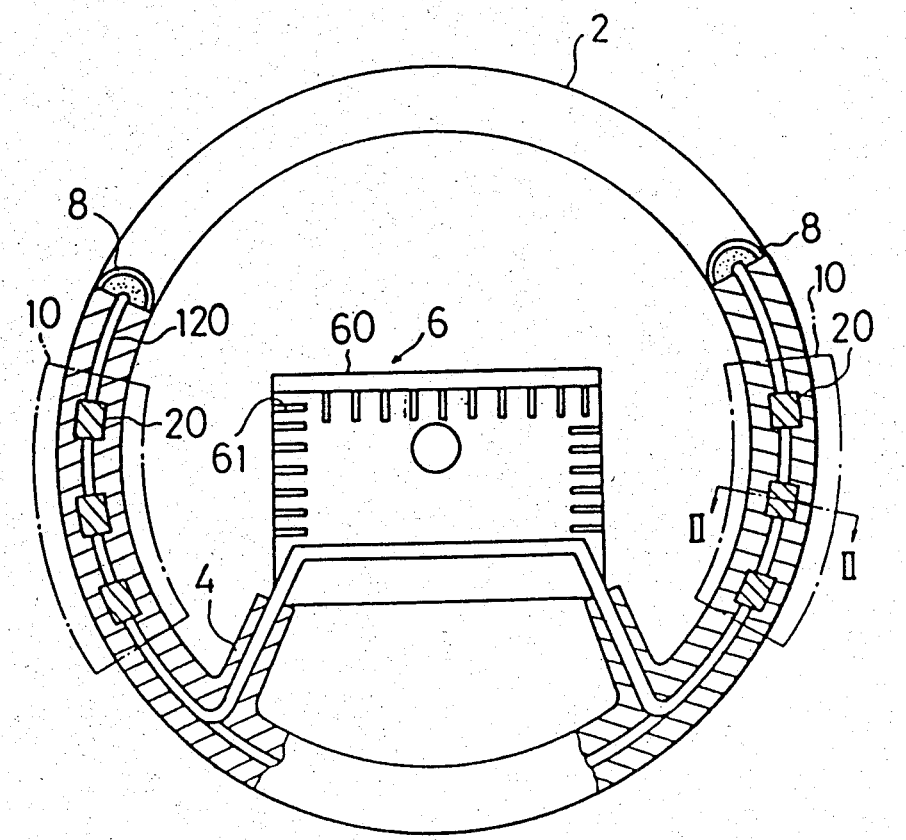
FIG. 8 is a partially sectional view of a steering wheel according to a second embodiment of the present invention.

Embodiment 2;

FIG. 8 is a partially sectional view illustrating a construction of a steering wheel according to a second embodiment of the present invention, in which the same portions as in the first embodiment are indicated by the same reference numerals. This second embodiment is characterized by a heat conduction route. A boss portion 6 has a metallic boss plate 60. On the circumferential portion of the boss plate 60 are formed radiation fins 61 comprising a multitude of metallic plates in the vertical direction. On the other hand, a heat pipe 120 which is a continuous body forming a closed circuit is disposed through ring portion 2, spoke portion 4 and boss portion 6. The heat pipe 120 is welded to the boss plate 60. Thermoelectric transducer modules 20 are connected heat-conductively to the heat pipe 120 in the ring portion 2. With such a construction, the heat absorbed by the plate 83 can be conducted to the radiation fins 61 through the heat pipe 120 and radiated efficiently. Conversely, in the case of heating the plate 83, heat can be absorbed from the radiation fins 61 and transmitted efficiently to the plate 83 through the heat pipe 120. Consequently, the heat radiation and absorption efficiency of the thermoelectric transducer modules 20 is improved.

Figure 4:
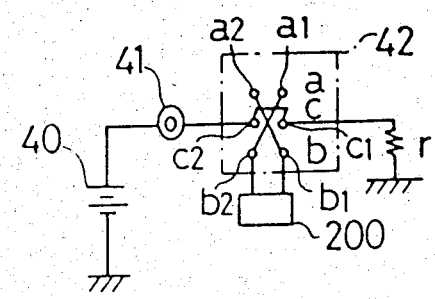
FIG. 4 is a circuit diagram of a control unit for driving the steering wheel of the first embodiment.

A control unit for driving this steering wheel will now be described. FIG. 4 shows an example of such control unit. A thermomodule 200 composed of plural thermoelectric transducer modules 20 is supplied with electric power from a vehicular battery 40 through a slide contact 41 attached to the back of the boss portion 6 of the steering wheel and a change-over switch 42 attached to the pad portion. By operating the change-over switch 42 to reverse the direction of current, there can be performed a switching control for cooling and heating the gripping portions of the ring portion of the steering wheel. The reference mark "r" shown in FIG. 4 denotes a compensating resistor for limiting the electric current.

Figure 5:
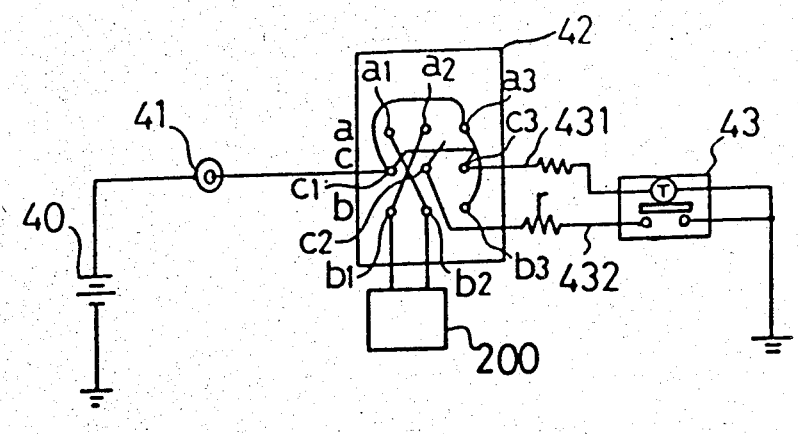
FIGS. 5 and 6 are circuit diagrams of other control units used for the same purpose.

FIG. 5 shows another example of a control unit, in which a timer circuit 43 is provided in addition to the components of the control unit of FIG. 4. More specifically, when contacts "c" (c1, c2 and c3) of the change-over switch 42 are connected to either change-over contacts "a" (a1, a2 and a3) or "b" (b1, b2 and b3), a battery voltage is applied to a timer signal input line 431 and the timer circuit 43 connects a load current line 432 to ground for only a predetermined time, so that an electric current flows in the thermomodule 200. In this way, the thermomodule 200 is supplied with electric power for only a predetermined time thereby effecting cooling or heating control for only the predetermined time.

Figure 6:
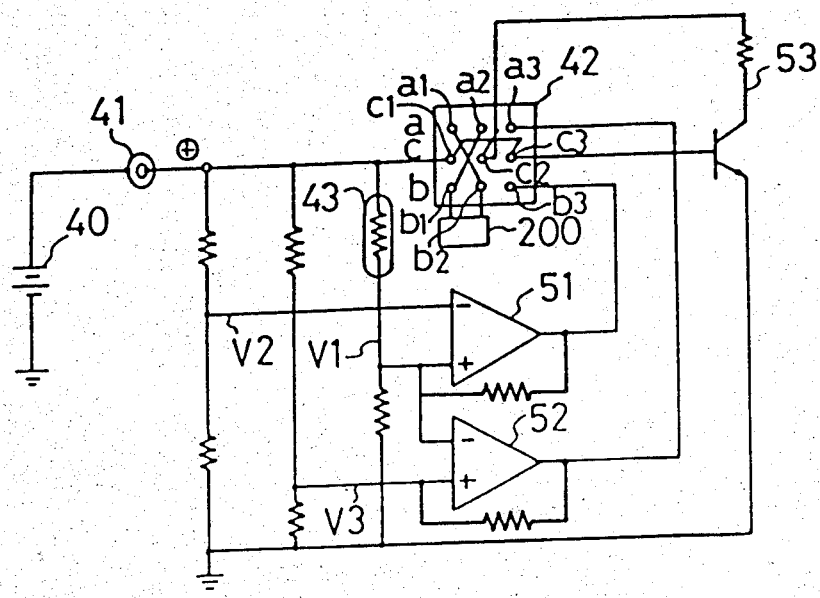

FIG. 6 shows a further example of a control unit, in which a thermistor 44 is connected to the plate 83. Only when the temperature of the plate reaches a predetermined level, is cooling effected by operating the change-over switch to the cooling side. Only when the temperature of the plate 83 is below a predetermined level, is electric current supplied to the thermomodule to heat the latter by operating the change-over switch 42 to the heating side. Voltage $V_2$ at an inverted input terminal of a comparator 51 is for setting the limit temperature for cooling the ring portion, while voltage $V_3$ at a non-inverted input terminal of a comparator 52 sets the limit temperature for heating the ring portion. Since the thermistor 44 has a negative temperature characteristic, a signal voltage $V_1$ increases as the temperature rises. Therefore, in case the plate 83 reaches a temperature higher than the temperature determined by the voltage $V_2$, the output signal of the comparator 51 becomes a high level. If at this time the contacts "c" (c1, c2 and c3) of the change-over switch 42 are connected to the contacts "b" (b1, b2 and b3), a transistor 53 turns on, so that electric current is fed to the thermomodule 200.

In the case where the temperature of the plate 83 is within the temperature range determined by the voltages $V_2$ and $V_3$, the transistor 53 does not conduct because the output levels of the comparators 51 and 52 are both low even if the change-over switch 42 is operated, so that the thermomodule 200 is not supplied with electric current.

When the temperature of the plate 83 becomes lower than the temperature determined by the voltage $V_3$, only the output of the comparator 52 becomes a high level. Consequently, when the contacts "c" (c1, c2 and c3) of the change-over switch 42 are connected to the contacts "a" (a1, a2 and a3), the transistor 53 turns on, so that electric current flows in the thermomodule in the direction opposite to the above and the plate 83 is heated.

In the above operation, when the temperature of the plate 83 reaches a certain range upon cooling or heating, the supply of current is stopped automatically by the action of the transistor 53 even without turning OFF the change-over contact 42, and a control is made so that the temperature of the plate 83 is held in a predetermined constant range.

What is claimed is:

1. Apparatus for heating and cooling a steering wheel, comprising:
    skin layer means adapted to form an outer surface of said steering wheel;
    heat conductive means, connected to an inside surface of said skin layer means, for transferring heat to and from said skin layer;
    thermal storage means, adapted to extend along a central portion of said steering wheel, for storing thermal energy;
    thermoelectric transducer means, thermally coupled to said heat conductive means and said thermal storage means, for generating and absorbing thermal energy, said transducer means including first and second heat generating/absorbing contact portions adapted to generate and absorb heat in accordance with an electric current supplied thereto, said first contact portion being thermally coupled to said heat conductive means, and said second contact portion being thermally coupled to said thermal storage means.

2. Apparatus according to claim 1, wherein said thermal storage means includes a hollow metallic body having an interior filled with a heat storing material.

3. Apparatus according to claim 1 further including a boss portion adapted to be positioned at the center of said steering wheel, and wherein said thermal storage means is thermally coupled to said boss portion, said thermal storage means comprising a heat pipe.

4. Apparatus according to claim 3, further including radiation fins formed on said boss portion so as to be in contact with ambient air, one end of said heat pipe being thermally coupled to said radiation fins.

5. Apparatus according to claim 2, wherein said heat storing material comprises a material selected from the group comprising Freon, water, metallic powder, polyethyleneglycol, and oil.

6. Apparatus according to claim 1 further including:
    switching means adapted for switching a direction of current flow in said thermoelectric transducer means; and
    timer means, connected to said switching means, adapted for limiting time during which said current is supplied to said thermoelectric transducers.

7. Apparatus according to claim 1 further including:
    temperature detector means for detecting a temperature of said heat conductive means and providing an output signal corresponding thereto;
    switching means adapted for switching a direction of current flow in said thermoelectric transducer means; and
    controller means adapted for controlling a supply of said current to said thermoelectric transducer means according to the output signal from said temperature detector means.

* * * * *